United States Patent [19]

Lauterberg et al.

[11] 4,153,762
[45] May 8, 1979

[54] PROCESS FOR WORKING ADDITIVE INTO POLYMERS, PARTICULARLY POLYMERS WHICH CAN BE FOAMED

[75] Inventors: Werner Lauterberg, Halle-Neustadt; Herbert Steinmetzer; Brigitte Weber, both of Leuna; Dieter Haack, Geschwenda; Werner Taube, Halle-Neustadt, all of German Democratic Rep.

[73] Assignee: VEB Leuna-Werke "Walter Ulbricht", Leuna, German Democratic Rep.

[21] Appl. No.: 839,157

[22] Filed: Oct. 3, 1977

Related U.S. Application Data

[63] Continuation of Ser. No. 636,399, Dec. 1, 1975, abandoned, which is a continuation-in-part of Ser. No. 552,451, Feb. 24, 1975, abandoned.

[51] Int. Cl.$^2$ .............................................. C08J 9/00
[52] U.S. Cl. .................................. 521/53; 260/42.56; 260/874; 260/897 A; 260/899; 521/134; 521/139; 521/908; 521/920
[58] Field of Search ........................ 260/2.5 B; 521/53

[56] References Cited

U.S. PATENT DOCUMENTS

| | | | |
|---|---|---|---|
| 2,907,075 | 10/1959 | Newly | 260/2.5 HA |
| 3,090,763 | 5/1963 | Hillier | 260/23 |
| 3,213,071 | 10/1965 | Campbell | 260/2.5 HA |
| 3,291,762 | 12/1966 | Raymond | 260/2.5 B |
| 3,371,053 | 2/1968 | Raskin | 260/2.5 B |
| 3,563,923 | 2/1971 | Buss et al. | 260/2.5 B |
| 3,775,353 | 11/1973 | Kohne, Jr. et al. | 260/2.5 B |
| 3,786,004 | 1/1974 | Furuya et al. | 260/2.5 N |
| 3,855,160 | 12/1974 | Shiotsu et al. | 260/2.5 N |
| 3,857,801 | 12/1974 | Kulas et al. | 260/2.5 B |
| 3,879,314 | 4/1975 | Gunning et al. | 260/2.5 B |
| 3,950,471 | 4/1976 | Stastny et al. | 260/2.5 B |

OTHER PUBLICATIONS

Union Carbide, "Chemically Loaded Molecular Sieves", Aug. 1959, pp. 1–6.

*Primary Examiner*—Morton Foelak
*Attorney, Agent, or Firm*—Nolte & Nolte

[57] ABSTRACT

The invention relates to a process for working additives into polymers, in which a mixture of thermoplastics with additives is heated to a temperature sufficient for the melting process, with the possible introduction of an expanding agent into the melt in which the expanding agent is homogenized, the melt being cooled if necessary to a temperature at which it can be extruded in the form of a foam plastic, the additives being adsorbed on a polymer flocculent matrix having a sufficient specific area, due to having a density of up to 0.6 g/cm$^3$ and 15 to 99% of open foam cells and being of the same or different polymer composition as the basic polymer.

11 Claims, No Drawings

PROCESS FOR WORKING ADDITIVE INTO POLYMERS, PARTICULARLY POLYMERS WHICH CAN BE FOAMED

This is a continuation, of application Ser. No. 636,399 filed Dec. 1, 1975 now abandoned, which is in turn a continuation-in-part of Ser. No. 552,451, filed Feb. 24, 1975, now abandoned.

This invention relates to a process for working additives into polymers, particularly polymers which can be foamed.

It is known that for the production of finely-pored foam plastics, the constituents are blended in a mixer and then fed via a dosing device to an extrusion press.

The constituents comprise the basic material, nucleating agents, coloring agents and other additives. For the production of foam plastics use is made of solid materials and additives having a small grain size in the range for example up to $200\mu$. Nucleating agents, coloring agents and other additives are blended in the mixer with the granular polymer and distributed as evenly as possible over the surface of the polymer. If the addition of pulverulent auxiliary materials and additives exceeds the absorption capacity of the granulate, which is determined by the properties of the components of the mixture, particularly the adhesion forces between the polymer and the additives, there is a risk that the additives will to some extent part from the granulate while the mixture is being conveyed to the feed hopper of the extruder.

Processes are known in which foam plastics are produced using citric acid and sodium bicarbonate as the nucleating agents. In these cases, the agents are used in quantities which ensure that the reaction of the acid with the carbonate produces water and carbon dioxide amounting to about 0.1 to 5 parts by weight to 100 parts by weight of the polymer substance and expanding agent.

The agent by which carbon dioxide is developed is known to be used in a moderate surplus, in order to avoid the corrosive effect of free acid on the material of which the extruder is made. The known ratios between the two components range from one part of citric acid to one part of sodium bicarbonate and one part of citric acid to a maximum of two parts of sodium bicarbonate, the absolute weights of each being subject to variation.

The effect of the nucleating agents depends on the nature of the thermoplastic substance to be foamed. Relatively small changes in the system of nucleating agents adopted may have a decisive influence on the cell size of the foam. In the foaming of polystyrene for example it was found that using citric acid hydrate and anhydrous citric acid a finer cell structure was obtainable than when using anhydous citric acid or citric acid hydrate alone. The adhesive forces between these bases and the plastic granulate are comparatively weak. When the mixture is being transported, therefore, some of the citric acid and sodium carbonate applied to the granulate parts and the constituents detached form a deposit in the conveyor mechanism.

The citric acid attracts atmospheric moisture and partly reacts with the sodium bicarbonate. Lumpy agglomerates are thus formed.

From time to time, some of these products are carried along by the conveyor and enter the extruder. The extruders are generally insufficient to divide up the comparatively hard agglomerates and homogenize them in the plastic melt. The deposits solidify under the effect of the increased temperature in the extruder and cause obstruction of the nozzle and the formation of voids and flaws in the foam. A further disadvantage of this known method of apportioning citric acid and sodium bicarbonate resides in the fact that a certain amount of each of these two substances falls away from the polymer granulate when the mixture is fed into the extruder, leading to incrustations on the screw. The incrustations detach themselves from the screw at intervals and clog the nozzle and likewise lead to the formation of voids in the foam. Owing to the loss of nucleating agent in transport, the polymer melt no longer has the necessary concentration of this agent when emerging from the nozzle. The formation of a fine foam plastic structure is thereby seriously impeded.

The foam plastic obtained is coarse-pored and non-homogeneous.

For many purposes, foam plastic of this kind is useless.

One method of increasing the absorption capacity of the granulate for the adhesion of the nucleating agents is the addition of adhesion agents. The concentration of these required for binding the entire quantity of nucleating agent, however, has an unfavorable effect on the formation of the foam plastic structure and reduces the quality of the foam plastic material.

A further known method for improving the homogeneous distribution of the nucleating agents in the plastic melt is the use of nucleating agent batch.

The production of nucleating agent bath may involve processing difficulties, as the melting temperature of the polymer substance is in some cases higher than the decomposition temperature of a nucleating agent component. When the nucleating agent is worked into the substances, therefore, its effect as a means of controlling porosity may be reduced. Furthermore, the supplementary operation of producing the batch renders the production of foam plastic more expensive.

One disadvantage of the known systems of nucleation agent having three components is the difficulty of ensuring an even and constant apportionment of the individual substances. If the individual components are unevenly dosed or if variations take place in the composition of the nucleating agent added, the foam plastic structure becomes less even and in many cases of a greater cell size. In the vast majority of applications a material of even and fine foam structure is required.

Similar problems arise when additives are worked into thermoplastic melts not capable of being foamed.

In the foaming of polyethylene, copolymers of ethylene and mixtures of polyethylene and the copolymers, the comparatively coarse foam structure liable to occur when certain pigments are added is found to present a drawback.

One known method for the coloring of thermoplastic materials is the addition of coloring pigments using a simple mixer such as a drum, tumbler or double cone mixer. The pigments adhere to the granulate owing to the adhesion forces between the two substances. This process, however, only enables small quantities of pigments to be bound to the granulate, and even then, some of the pigment may separate from the granulate during the transport of the mixture to the processing machine with a consequent effect on the shade of the final product.

Somewhat higher proportions of pigment necessitate the addition of adhesion agents. In order to ensure that the properties of the thermoplastics are not unfavorably affected, the quantities of adhesion agent used often have to be kept very low.

With this method likewise the proportion of pigment which can be added to the granulate is still very limited. The addition of greater quantities of pigment easily leads to the formation of lumps. To enable larger proportions of pigment to be worked into a thermoplastic in a homogeneous manner a further method provides for the mixing using internal mixers. This method of producing the coloring batch represents a supplementary operation necessitating far more expensive mixing apparatus. The same applies when other additives have to be worked in.

This invention seeks to improve distribution of additives in plastic melts and to ensure a finer pore size in the foam plastics produced and provides for the additives required in the processing of plastics to be applied to the polymer in a simple mixer, without the use of adhesion agents, in such a way that the concentration of the mixture undergoes no appreciable change when the mixture is transferred into the extruder so that the plastic melt emerging from the nozzle of the extruder will contain a constant and uniform concentration of additives.

According to this invention, there is provided a process for working additives into polymers in which a mixture of one or more thermoplastics with the necessary additives is heated to a temperature sufficient for the melting process, with the possible introduction of an expanding agent into the melt in which the expanding agent is homogenized, the melt being cooled if necessary to a temperature at which it can be extruded in the form of a foam plastic, the additives being adsorbed on a polymer flocculent matrix having a sufficient area due to having a density of up to 0.6 g/cm$^3$ and 1 to 99% of open foam cells and being of the same or different polymer composition as the basic polymer. The additives may be likewise advantageously applied to a mixture consisting of a polymer flocculent matrix and a polymer granulate.

An "open foam cell" is a cell formed by the foaming which cell is open on the surface of the polymer flocculent matrix. Hence, a percentage "open foam cells" means the percentage of the total number of foam cells which are open in the aforementioned sense. The capacity of the matrix for adsorbing additives depends on the specific area (surface area per unit weight) and configuration of the surfaces thereof. The greater the specific area of the matrix and the more fissured the surfaces, the greater the adsorption capacity of the matrix. However, a polymeric matrix having a very high specific area and very densely fissured surfaces tends to form bridges while being charged to the processing machinery, which is disadvantageous. To avoid this problem, it is preferred that the percentage open foam cells not exceed 85%.

The thermoplastics used may advantageously be polyethylene of high or low density, polypropylene, polyvinyl chloride, polystyrene or copolymers and graft polymers of ethylene, propylene, vinyl chloride or styrene with other monomers such as vinyl acetate or vinyl propionate, as well as ethylene and propylene with vinyl chloride and/or mixtures thereof.

It is also of advantage to use mixtures of these thermoplastics with waxes, such as polyethylene waxes or oxides thereof, and/or rubber.

The expanding agents used comprise easily volatile organic compounds, such as butane, heptane, halogen hydrocarbons, or mixtures thereof and/or solid organic or inorganic substances, such as mixtures of citric acid and sodium bicarbonate or mixtures of other monobasic or dibasic organic acids with a carbonate of an alkali or alkaline earth metal. Preferably, 1.5 to 15 mol and especially 2 to 6 mol of a hydrogen carbonate or 0.8 to 7.5 mol and especially 1 to 3 mol of a carbonate are used per equivalent weight of acid of the organic acid.

The additives used may comprise nucleating agents, solid expanding agents, coloring agents, flame inhibiting additives, stabilizers, fillers, anti-statics, reinforcement materials, lubricants or fungicides. It is preferred that the nucleating agent consist of sodium bicarbonate and citric acid in a molar proportion of the former to the latter in the range of 4.5:1 to 45:1 and especially 6:1 to 18:1.

The application of the additives to the polymer flocculent matrix is effected by high-speed mixers, or with barrel, tumbler or double-cone mixers. Owing to the large specific area of the foam plastic flakes, the additives adhere satisfactorily and do not detach during transport. The mixture ratio between the foam plastic flakes and additives ranges from 0.5 to 200 parts by mass of foam plastic flakes to 1 part by mass of additives, preferably 10 to 100 parts by mass of foam plastic flakes to 1 part by mass of additives.

The mixing times involved depend on the mixer used and on the constituents and range from 0.25 to 60 minutes.

In the process of the invention, the additives are applied in an even quantity to the polymer. No losses occur in the course of transport and deposits of additives in the mechanisms are avoided. In particular, the foam plastics thus produced have a homogeneous surface and no voids or blisters occur.

The invention is further explained with reference to the following examples, in which proportions are by mass (i.e., weight) unless otherwise indicated.

EXAMPLE 1

In a crusher a polyethylene foam foil with a density of 0.15 g/cm$^3$ and of 2 mm in thickness was broken up to form flakes. The foam plastic flakes had a bulk density of 0.07 g/cm$^3$.

15 kg. of the foam plastic flakes were mixed with 225 g of citric acid and 225 g. of sodium bicarbonate in a barrel mixer. The mixing time was 30 minutes. The mixture was fed to a doublescrew extruder through a dosing and weighing machine. Polyethylene granulate was likewise fed into the filling hopper of the extruder through a second dosing and weighing machine.

5 kg. of the mixture was dosed for each 50 kg. of polyethylene granulate It was plasticised at temperatures of 165° C. and in a zone of relatively low pressure 4% by weight of a mixture of trichloromonofluoromethane and dichlorodifluoromethane was injected in a ratio of 1:4 through an inlet socket. In the subsequent zones of the extruder the expanding agent was worked into the plastic melt. The temperature of the plastic melt was reduced. To ensure better homogenization, the plastic melt was conveyed through a single-screw extruder into a molding head which was fitted with an annular nozzle. On emergence of the plastic melt from the extruder, the melt was caused to foam up under the effect of the expanding agent.

This resulted in the production of a tubular film, which was drawn off through a cooling bulb. Owing to the cooling effect and the supporting air blown into the tubular film and cooling air blown onto it from outside, the foam structure was "fixed". The tubular film, after the foam structure had fixed, was cut with a knife, spread out, cooled by a current of air and wound up. The resulting foam plastic foil was characterized in the evenness of the foam cells, a pore diameter of 0.001 to 0.5 mm. and an average number of pores of 50 per mm$^2$. The foil was free of voids and blisters and exhibited a continuous surface.

After a throughput of 5 tons no deposits in the mechanism of the dosing apparatus or on the extruder were noted.

If the nucleating agent was applied to the granulate via a drum type mixer, in the usual manner, and fed into the extruder in this form, these foam plastic foils were found to have the following properties and appearance.

The pore diameter ranged from 0.1 to 1.0 mm. and the average number of pores per mm$^2$. was 15. The surface was not completely continuous. After a throughput of 200 kg. of mixture over 100 g. of the nucleating agent was deposited in the conveying apparatus. After a throughput of 5 tons deposits were found in the extruder screw.

EXAMPLE 2

In a crusher a polyethylene foam foil with a density of 0.15 g/cm$^3$ and of 2 mm. in thickness was broken up to form flakes. The foam plastic flakes had a bulk density of 0.07 g/cm$^3$. 15 kg. of the foam plastic flakes were mixed with 120 g. of citric acid and 360 g. of sodium bicarbonate in a barrel mixer. The mixing time was 30 minutes. The mixture was fed to the double-screw extruder through a dosing and weighing machine. Polyethylene granulate was likewise fed into the hopper of the extruder via a second dosing and weighing machine.

5 kg. of the mixture was dosed for each 50 kg. of polyethylene granulate. It was plasticized at temperatures of 165° C. and in a zone of relatively low pressure 4% by weight of a mixture of trichloromonofluoromethane and dichlorodifluoromethane was injected in a ratio of 1:4 through an inlet socket. In the subsequent zones of the extruder the expanding agent was worked into the plastic melt. The temperature of the plastic melt was reduced. To ensure better homogenization the plastic melt was conveyed through a single-screw extruder into a molding head which was fitted with an annular nozzle. On the emergence of the plastic melt from the extruder the mass was foamed under the effect of the expanding agent. This resulted in the production of a tubular film, which was drawn off through a cooling bulb. Owing to the cooling effect and the supporting air blown into the tubular film and the cooling air blown onto it from outside, the foam structure was "fixed". The tubular film, after the foam structure had been fixed, was cut with a knife, spread out, cooled by a current of cooling air and wound up. The resulting foam plastic foil was characterized by the evenness of the foam cells, a pore diameter of under 0.1 mm. and an average number of pores of more than 15 per mm$^2$. The foil was free of voids and blisters and showed a continuous surface.

After a throughput of 5 tons no deposits were found in the mechanism of the dosing apparatus or on the extruder screw.

If the nucleating agent was applied to the granulate via a drum type mixer in the usual manner and fed into the extruder in this form the foam plastic foils were found to have the following properties and appearance:

The pore diameter ranged from 0.1 to 1.0 mm. and the average number of pores per mm$^2$. was 15. The surface was not completely continuous. After a throughput of 200 kg. of mixture over 100 g. of the nucleating agent had deposited in the conveying apparatus. After a throughput of 5 tons, deposits of substance were found in the extruder screw.

EXAMPLE 3

In a crusher a foam plastic plate of 10 mm. in thickness and consisting of 60 parts of ethylene vinyl acetate copolymer with a vinyl acetate content of 5% by weight and 40 parts of polyethylene, the plate having a density of 0.25 g/cm$^3$, was cut into flakes. The foam plastic flakes had an apparent density of 0.1 g/cm$^3$.

15 kg. of these flakes were mixed in a tumbler mixer with 225 g. of citric acid, 225 g. of sodium bicarbonate, 1050 g. of cadmium citrine and 450 g. of iron red. The mixing time was 30 minutes.

The mixture was conveyed through a dosing and weighing apparatus to a double-screw extruder. A mixture of granular polyethylene (40% by mass) and ethylene vinyl acetate copolymer containing 5% by weight of vinyl acetate (60% by mass) was fed into the extruder through a second dosing and weighing apparatus.

The proportion of foam plastic flakes on which the additives were adsorbed amounted to 5 kg. for each 50 kg. of granulate mixture. The mixture was processed in the extruder in accordance with Example 1.

The resulting foam plastic foil was found free from voids and blisters, its cells being homogeneous, with a diameter of 0.005 to 0.5 mm. and the average number of pores per mm$^2$ being 50. The coloring was even. No differences in shade were visible to the naked eye in the foam plastic foils produced from six different mixtures prepared.

No deposits occurred in the conveyor mechanism or on the extruder screws.

EXAMPLE 4

In a crusher a foam plastic plate of 10 mm. in thickness and comprising 60 parts of ethylene vinyl acetate copolymer with a vinyl acetate content of 5% by weight and 40 parts of polyethylene and having a density of 0.25 g/cm$^3$, was cut into flakes. The foam plastic flakes had an apparent density of 0.1 g/cm$^3$.

15 kg. of these flakes were mixed in a tumbler-type mixer with 120 g. of citric acid, 360 g. of sodium bicarbonate, 1050 g. of cadmium citrine and 450 g. of iron red. The mixing time was 30 minutes.

The mixture was conveyed through a dosing and weighing apparatus to a double-screw extruder. A mixture of granular polyethylene (40% by mass) and ethylene vinyl acetate copolymer containing 5% by weight of vinyl acetate (60% by mass) was fed into the extruder through a second dosing and weighing apparatus.

The proportion of foam flakes on which the additives were adsorbed was 5 kg. for each 50 kg. of granulate mixture. The mixture was processed in the extruder in accordance with Example 1.

The resulting foam plastic foil was found free of voids and blisters, the cells being homogeneous with a diameter of less than 0.1 mm. and the average number of pores per mm$^2$ being 50. The coloring was even. No differences in shade were visible to the naked eye in the foam plastic foils produced from six different mixtures prepared.

No deposits occured in the conveyor mechanism or on the extruder screws.

EXAMPLE 5

10 kg. of polyethylene foam flakes, 5 kg. of polyethylene granulate and 1500 g. of white pigment were mixed in accordance with Example 1.

The addition of polyethylene granulate to the color mixture rendered the latter easier to dose as required. The color mixture was fed into an extruder via a dosing and weighing apparatus. With a second dosing and weighing apparatus polyethylene granulate was fed to the extruder, the proportion of color mixture amounting to 25 g. per 180 g. of polyethylene. The extruder used had a screw diameter of 60 mm. and a screw length of 25 times the diameter. It was provided with an entry zone, a degasification zone and two compression zones. The throughput amounted to 40 kg/h. The granulate obtained showed fully satisfactory color distribution. Thin-layer tests showed no pigment agglomerates with a diameter over 50 μm. The granulate grains were free of gas occlusions.

EXAMPLE 6

In a crusher, a polystyrene foam film, 1.8 mm. thick and having a density of 0.05 g/cm$^3$, was broken up to form flakes. The foam flakes had a bulk density of 0.02 g/cm$^3$. 10 kg. of the foam flakes were mixed in a barrel mixer with 100 g. of citric acid, 105 g. of sodium bicarbonate and 10 kg. of polystyrene granulate. The mixing time was 30 minutes. The mixture was fed to a double-screw extruder through a dosing and weighing machine. Polystyrene granulate was likewise fed into the hopper of the extruder via a second dosing and weighing machine. 20 kg. of the mixture was metered for each 100 kg. of polystyrene. In a zone of relatively low pressure, 5% by weight of a mixture of trichloromonofluoromethane and dichlorodifluoromethane in a ratio of 1:4 was injected through an inlet connection into the plasticized melt. The expanding agent was worked into the plastic melt in the subsequent zones.

In the zones of the extruder near the molding head, the temperature was lowered into the range of the temperature of solidification of the polystyrene. On the emergence of the plastic melt from the extruder, the mass was foamed under the effect of the expanding agent. This resulted in the production of a tubular film, which was drawn off over a cooling bulb. Cooling solidified the foam structure.

The resulting foam film was characterized by great uniformity of the foam cells and cell diameters of from 0.001 to 0.1 mm. The film was free of pinholes and had a closed surface. No deposits were found on the extruder screw after a throughput of 10 tons.

EXAMPLE 7

In a crusher, a 1.6 mm. thick polypropylene film, having a density of 0.14 g/cm$^3$, was broken up to form flakes.

The foam flakes had a bulk density of 0.07 g/cm$^3$. 10 kg. of the foam flakes were mixed in a barrel mixer with 150 g. of citric acid and 100 g. of sodium bicarbonate. As in Example 6, the mixture was fed into a double-screw extruder, melted therein and mixed therein with a foaming agent. The resulting melt was made to foam, and a foam film was formed thereof.

The resulting foam film exhibited a uniform foam structure and cell diameters of from 0.005 to 0.3 mm. The film was free of pinholes and had a closed surface.

No deposits were found on the extruder screw after a throughput of 5 tons.

What is claimed is:

1. In a process for working solid additives into a thermoplastic polymer wherein a mixture of thermoplastic granulate and said additives are heated to a temperture sufficient for melting said thermoplastic polymer, followed by homogenizing, and extruding the molten mixture; the improvement which comprises first mixing said solid additive with organic polymeric foam plastic flakes having a density up to 0.6 g/cm$^3$ and 15 to 85% open foam cells to effect adsorption of said additives onto said polymeric flakes, then adding said additives adsorbed on said polymeric flakes to said thermoplastic polymer granulate prior to heating this mixture in order to achieve uniform distribution of said additives in said thermoplastic polymer.

2. The process in accordance with claim 1, wherein said solid additives are selected from the group consisting of nucleating agents, expanding agents, and coloring agents.

3. The process of claiam 2, wherein the mixture ratio between the polymeric flakes and the additives ranges from 0.5 to 200 parts by mass of said flakes to 1 part by mass of additives.

4. The process of claim 1, wherein the additives are coloring agents.

5. The process of claim 4, wherein the thermoplastic polymer and the plastic flakes may be of the same or different polymer composition and are selected from the group consisting of polyethylene, polypropylene, polyvinylchloride, polystyrene, the copolymers of ethylene, propylene, vinyl chloride or styrene with vinyl acetate or vinyl propionate, the copolymers of ethylene and propylene with vinyl chloride, and mixtures thereof.

6. In a process for working solid additives into a thermoplastic polymer wherein a mixture of thermoplastic granulate and said additives are heated to a temperature sufficient for melting said thermoplastic polymer, followed by introducing an expanding agent into the melt, homogenizing and extruding the melt in the form of a foam plastic; the improvement which comprises adding said solid additives adsorbed on organic polymeric foam plastic flakes having a density up to 0.6 g/cm$^3$ and 15 to 85% open foam cells to said thermoplastic polymer granulate, prior to melting the mixture, in order to achieve uniform distribution of said additives in said thermoplastic polymer.

7. The process of claim 6, wherein the additive comprises a nucleating agent consisting of sodium bicarbonate and citric acid in a molar porportion of the former to the latter in the range of 4.5:1 to 45:1.

8. The process of claim 6, wherein the thermoplastic polymer and the plastic flakes may be of the same or different polymer composition and are selected from the group consisting of polyethylene, polypropylene, polyvinylchloride, polystyrene, the copolymers of ethylene, propylene, vinyl chloride or styrene with vinyl acetate or vinyl propionate, the copolymer of ethylene and propylene with vinyl chloride and mixtures thereof.

9. The process of claim 6, wherein the solid additives are either nucleating agents, expanding agents, or coloring agents.

10. The process of claim 6, wherein the weight ratio of polymeric foam plastic flakes to additives is 0.5 to 200 parts plastic flakes to 1 part additives.

11. The process of claim 6, wherein the additives comprise a coloring agent and a nucleating agent consisting of sodium bicarbonate and citric acid in a molar ratio of 6.1 to 18.1 of the former to the latter.

* * * * *